No. 668,741. Patented Feb. 26, 1901.
E. PRIDMORE.
BUNDLE CARRIER FOR GRAIN BINDERS.
(Application filed Oct. 19, 1899.)
(No Model.) 2 Sheets—Sheet 1.
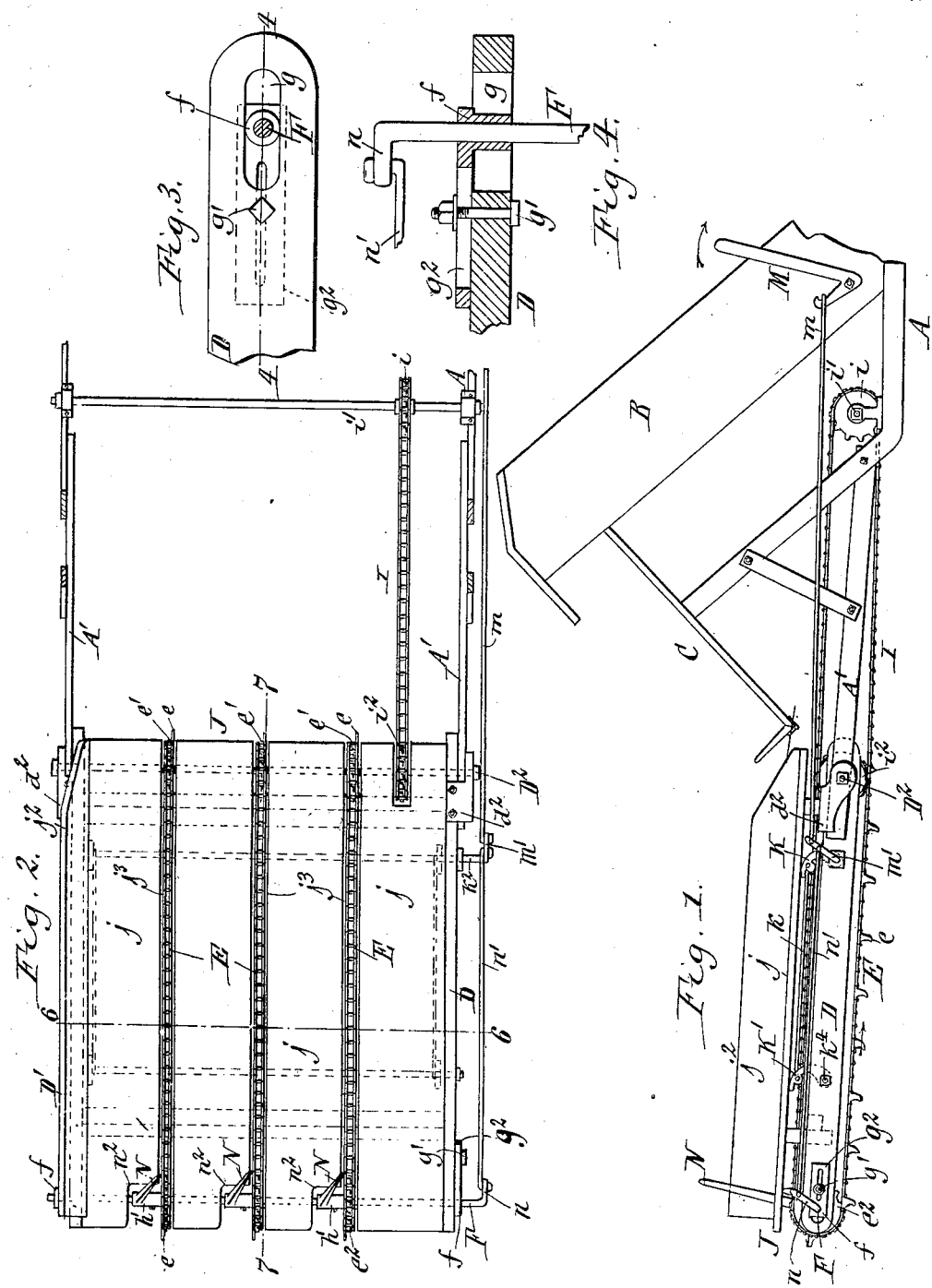

No. 668,741. Patented Feb. 26, 1901.
E. PRIDMORE.
BUNDLE CARRIER FOR GRAIN BINDERS.
(Application filed Oct. 19, 1899.)
(No Model.) 2 Sheets—Sheet 2.
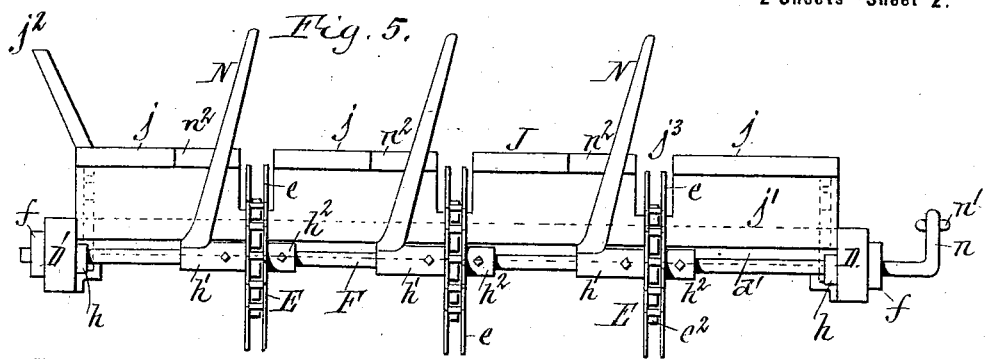
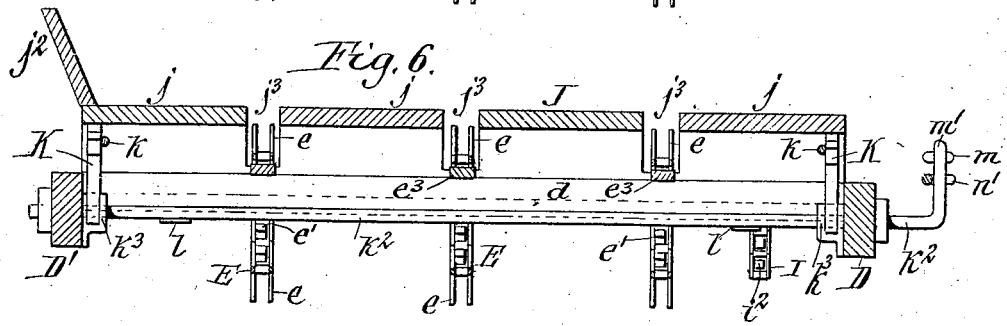
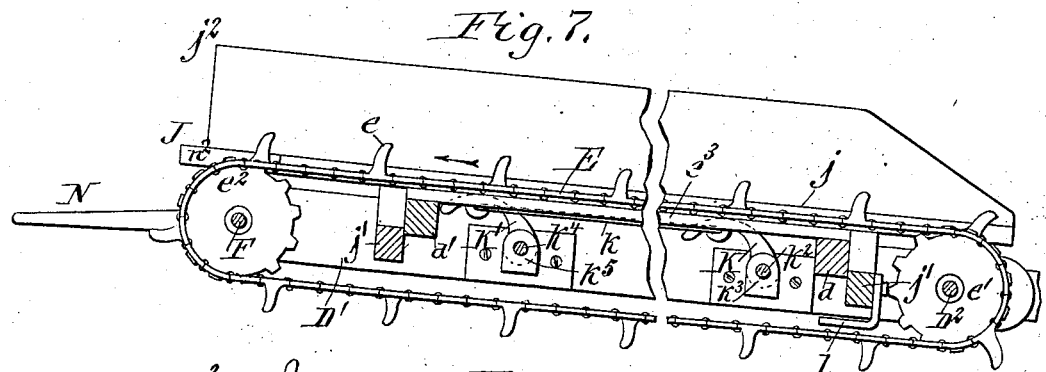
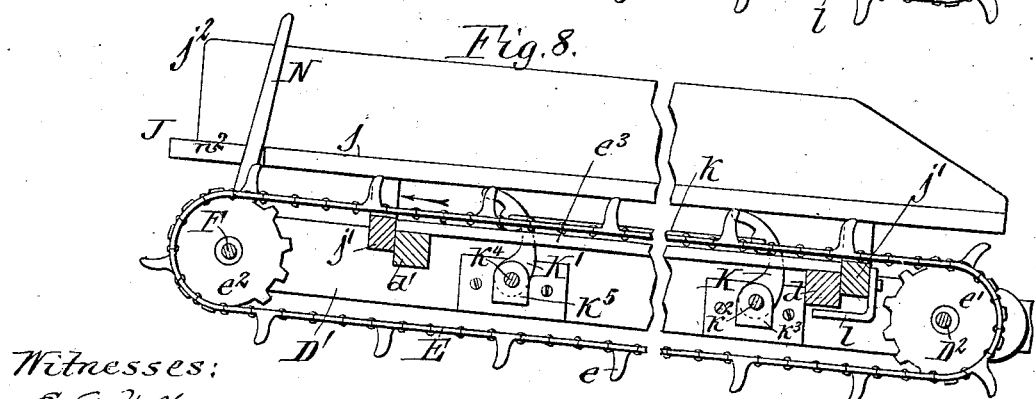
Witnesses:
E. A. Volk
F. F. Schenzinger
Edward Pridmore, Inventor.
By Wilhelm & Bonner, Attorneys.

UNITED STATES PATENT OFFICE.

EDWARD PRIDMORE, OF BATAVIA, NEW YORK, ASSIGNOR TO THE JOHNSTON HARVESTER COMPANY, OF SAME PLACE.

BUNDLE-CARRIER FOR GRAIN-BINDERS.

SPECIFICATION forming part of Letters Patent No. 668,741, dated February 26, 1901.

Application filed October 19, 1899. Serial No. 734,110. (No model.)

*To all whom it may concern:*

Be it known that I, EDWARD PRIDMORE, a citizen of the United States, residing at Batavia, in the county of Genesee and State of New York, have invented new and useful Improvements in Bundle-Carriers for Grain-Binders, of which the following is a specification.

This invention relates to a bundle-carrier for grain-binders, and has for its object to provide a bundle-carrier which reliably holds the bundles until the required number have been collected and which permits of discharging the collected bundles quickly in a pile from the outer end of the carrier.

In the accompanying drawings, consisting of two sheets, Figure 1 is a fragmentary rear elevation showing my improved bundle-carrier applied to the elevator of a grain-binder. Fig. 2 is a top plan view thereof, partly in section. Fig. 3 is a sectional inside view, on an enlarged scale, showing one of the adjustable bearings whereby the discharge-belts are tightened. Fig. 4 is a horizontal section in line 4 4, Fig. 3. Fig. 5 is a side elevation of the bundle-carrier, on an enlarged scale, viewed from the discharge end. Fig. 6 is a cross-section of the same, on an enlarged scale, in line 6 6, Fig. 2. Fig. 7 is a fragmentary longitudinal section of the carrier, on an enlarged scale, the section being taken in line 7 7, Fig. 2, and showing the platform lowered for discharging the bundles. Fig. 8 is a similar view of the carrier, showing the platform raised for collecting the bundles.

Like letters of reference refer to like parts in the several figures.

A represents the main frame of the grain-binder, B the elevator, and C the binder-deck, all of which parts may be of any well-known or suitable construction.

The main frame of the bundle-carrier consists, essentially, of two longitudinal side bars D D' and two cross-bars $d$ $d'$, connecting the side bars near their inner and outer ends, respectively. This frame is pivoted with its inner end to the binder-frame adjacent to the discharge end of the binder-deck by a transverse shaft $D^2$, which passes through the outer ends of the arms A' of the main frame. This pivoting of the bundle-carrier permits the latter to be folded upwardly toward the binder-deck, so as to make the machine more compact for transportation. The downward movement of the carrier-frame is limited by the brackets $d^2$, which are connected with the inner ends of the carrier-frame and which overlap the arms A' and bear upon the same when the carrier-frame is in its working position, as represented in Figs. 1 and 2. The shaft $D^2$ is journaled in the inner ends of the side bars of the carrier-frame, in the brackets $d^2$, and in the outer ends of the arms A' of the grain-binder frame.

E represents a number of belts or chains which constitute the principal part of the propelling device, whereby the bundles are discharged from the carrier, three of these chain belts being shown in the drawings. These belts are arranged lengthwise in the carrier-frame and are provided at intervals with projecting teeth $e$. These belts pass with their receiving portions around sprocket-wheels $e'$, which are secured to the inner shaft $D^2$, and with their delivery portions around delivery sprocket-wheels $e^2$. The upper portions of these discharge-belts are the carrying or conveying portions and are supported by intermediate guide-bars $e^3$, Figs. 6, 7, and 8, which are arranged lengthwise and secured with their ends to the front and rear cross-bars $d$ $d'$. The delivery sprocket-wheels turn loosely on a transverse rock-shaft F, which is journaled in bearings $f f$ on the outer ends of the side bars D D'. Each of the bearings of the outer shaft is capable of longitudinal adjustment with reference to the side bars for taking up the slack in the belts. For that purpose each bearing is arranged in a longitudinal slot $g$ in the outer end of the side bar and fastened by a bolt $g'$, arranged in the side bar and passing through a slotted arm $g^2$ on the bearing, as shown in Figs. 1, 2, 3, and 4. The outer shaft F is held against lengthwise displacement by collars $h$, secured to said shaft and bearing against the inner side of its bearings, and the delivery sprocket-wheels are held against displacement on this shaft by collars $h'$ $h^2$, secured to said shaft on opposite sides of each delivery sprocket-wheel. These chain belts are driven so as to move with their upper portions outwardly in the direction of the arrows, Figs. 1, 7, and 8, by a drive chain or belt I, passing around a sprocket-wheel $i$ on the driving-shaft $i'$ of the grain-binder and around a sprocket-wheel $i^2$ on the inner shaft $D^2$ of the belts.

J represents a vertically-movable slotted platform or support, upon which the bundles delivered from the binder-deck are collected and from which the bundles are discharged at intervals by the discharge-belts. This platform consists of a number of longitudinal boards $j$, arranged above and between the discharge-belts, and two cross-bars $j'$, which are secured to the under side of these boards and arranged in front and in rear of the front and rear cross-bars of the carrier-frame, as shown in Figs. 5 and 8. The platform is provided along its front side with a longitudinal butt-board $j^2$, against which the butt-ends of the bundles bear and whereby the bundles are straightened on the platform and prevented from sliding off the front end thereof. The platform is held against longitudinal displacement by its cross-bars $j'$ engaging with the cross-bars of the carrier-frame and against lateral displacement by the ends of its cross-bars engaging with the inner sides of the longitudinal bars of the carrier-frame, as shown in Figs. 5 and 8. The platform-boards are arranged so far apart that the longitudinal slots $j^3$, formed between them, receive the carrying portions of the discharge-belts upon lowering the platform. The latter is lowered by its own weight and by that of the bundles resting upon the platform, and it is raised by a number of cams K K', which engage against the under side of the platform. Two of these cams are pivoted on the inner side of each side bar of the carrier-frame and engage underneath the inner and outer parts, respectively, of the platform. Each pair of cams is connected by a connecting-rod $k$, so as to cause the same to rock together. The inner cams K of both pairs are secured on an inner rock-shaft $k^2$, which is journaled in bearings $k^3$ on the side bars, and both outer cams K' are secured to a rock-shaft $k^4$, which is journaled in bearings $k^5$ on the inner side of the side bars. The upward movement of the platform is limited and the latter is prevented from becoming detached from the carrier-frame by hooks $l\ l$, secured to the inner cross-bar of the platform and adapted to engage with the under side of the inner cross-bar of the carrier-frame, as shown in Figs. 6, 7, and 8.

When it is desired to collect the bundles on the platform, the cams are turned with their salient parts into engagement with the platform, whereby the latter is raised and held in an elevated position, so that the top of the platform is above the teeth of the discharge-belts. When the desired number of bundles has accumulated on the platform, the cams are turned so that their receding parts support the platform, thereby lowering the platform. In this lowered position of the platform the teeth of the discharge-belts project above the top of the platform. As soon as the teeth project above the platform the bundles are grasped by the teeth and quickly discharged in a pile from the outer end of the platform.

M represents a lever whereby the cams are operated for raising and lowering the platform. This lever is pivoted to any suitable part of the machine within convenient reach of the operator and is connected by a rod $m$ with an upwardly-projecting crank $m'$ on the rear end of the inner cam-shaft, as shown in Figs. 1 and 2.

N represents a number of guard-arms which prevent the bundles from escaping from the outer end of the platform while the latter is raised and while the bundles are being collected upon the same. These guard-arms are mounted on the outer rock-shaft F, so as to take part in the movement thereof and are for that purpose preferably formed integrally with the collars $h'$ on one side of the delivery sprocket-wheels. The outer rock-shaft F is provided with an upwardly-projecting crank $n$, which is connected by a rod $n'$ with the crank $m'$ on the inner rock-shaft $k^2$. By reason of this connection the guard-arms turn simultaneously with the cams. The platform is raised by the operator moving the lever M in the proper direction. This movement of the lever M turns the cams and the guard-arms upwardly. The platform is held in its elevated position by the operator holding the lever M in position by his foot. When it is desired to lower the platform, the operator releases the lever M. The weight of the platform and the load resting thereon now lowers the platform and turns the cams downwardly, and this turning movement of the cams causes the guard-arms to turn downwardly at the same time. The outward pressure of the collected bundles against the guard-arms also causes the latter to turn, and this pressure against the guard-arms and their turning movements are further increased when the platform has been lowered sufficiently to cause the bundles to move outwardly under the action of the delivery-belts, so that the guard-arms are swung out of the way of the bundles as the platform is lowered, and the latter is lowered quickly. It is obvious that the platform can also be lowered positively and without relying upon the weight thereof by moving the lever M in the proper direction.

The platform is preferably extended outwardly beyond the guard-arms, in which case the outer end of the platform is provided with notches $n^2$, into which the arms enter when in their upwardly-projecting position.

In order to prevent the bundles from being caught on the guard-arms when dumping the bundles, the arms are inclined rearwardly, as shown in Figs. 2 and 5, which causes the same to clear themselves from the bundles as the platform moves forward while the dumping of the bundles takes place. The cams are so constructed that they are nearly on the dead-center when they have elevated the platform into its highest position, so that it requires no considerable exertion on the part of the operator to hold the platform up.

This bundle-carrier is very simple and durable in construction and not liable to get out of order, and it permits of rapidly dumping the load of bundles, so that the latter form a pile on the ground instead of being scattered.

I claim as my invention—

1. In a bundle-carrier, the combination with a bundle-propelling device, of a bundle-support movable vertically toward and from said propelling device, and a movable guard arranged at the discharge end of said support and movable with reference thereto, to be projected above the same for preventing the escape of the bundles therefrom or to be lowered to clear the discharge end of the support and permit the discharge of the bundles therefrom, substantially as set forth.

2. In a bundle-carrier, the combination with a bundle-propelling device, of a bundle-support movable vertically toward and from said propelling device, a movable guard arranged at the discharge end of said support and movable with reference thereto, to be projected above the same for preventing the escape of the bundles therefrom or to be lowered to clear the discharge end of the support to permit the discharge of the bundles therefrom, and means whereby said bundle-support and said guard are simultaneously raised and lowered, substantially as set forth.

3. In a bundle-carrier, the combination with a bundle-propelling device, of a bundle-support movable toward and from said propelling device, a rocking guard-arm arranged at the discharge end of said support, means whereby said support is raised and lowered, and connecting mechanism whereby said guard-arm is swung up when said support is raised and swung down when said support is lowered, substantially as set forth.

4. In a bundle-carrier, the combination with the bundle-propelling device and the bundle-support movable, toward and from said propelling device, of a cam whereby said support is raised and lowered, a rocking guard-arm arranged at the discharge end of said support, and means whereby said cam is connected with said guard-arm to operate both simultaneously, substantially as set forth.

5. In a bundle-carrier, the combination with the bundle-propelling device and the bundle-support movable toward and from said propelling device, of a cam whereby said support is raised and lowered, a rock-shaft on which said cam is mounted and which is provided with a crank, a guard-arm arranged at the discharge end of said support, a rock-shaft supporting the guard-arm and provided with a crank, and a rod connecting the cranks of said shafts, substantially as set forth.

6. In a bundle-carrier, the combination with the carrier-frame comprising side bars and cross-bars connecting the side bars, of a slotted platform arranged above the carrier-frame and movable toward and from the same, said platform being provided with cross-bars engaging against the side and cross bars of the carrier-frame, and discharge-belts arranged in the carrier-frame underneath the slots of the platform, substantially as set forth.

7. In a bundle-carrier, the combination with the carrier-frame comprising side bars and cross-bars connecting the side bars, and intermediate longitudinal guide-bars connecting the cross-bars, of a movable platform provided with slots over said guide-bars, and discharge-belts arranged in the carrier-frame underneath said slots and supported with their upper portions on said guide-bars, substantially as set forth.

8. In a bundle-carrier, the combination with the carrier-frame and the receiving and delivery wheels, of discharge-belts passing around said receiving and delivery wheels, a platform movable toward and from the belts and provided with slots which receive the belts, cams whereby said platform is operated, a rock-shaft supporting said cams and provided with a crank, a rotary shaft supporting said receiving-wheels, a rock-shaft supporting said delivery-wheels and provided with a crank, a guard-arm moving with the rock-shaft supporting the delivery-wheels, and a rod connecting said cranks, substantially as set forth.

Witness my hand this 11th day of October, 1899.

EDWARD PRIDMORE.

Witnesses:
E. W. ATWATER,
F. E. HOWE.